US012153968B2

(12) United States Patent
Shveidel et al.

(10) Patent No.: US 12,153,968 B2
(45) Date of Patent: Nov. 26, 2024

(54) SYNCHRONIZATION OBJECT HAVING A STAMP FOR FLOWS IN A STORAGE SYSTEM

(71) Applicant: EMC IP Holding Company LLC, Hopkinton, MA (US)

(72) Inventors: Vladimir Shveidel, Pardes-Hana (IL); Lior Kamran, Rishon LeZion (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 746 days.

(21) Appl. No.: 17/197,163

(22) Filed: Mar. 10, 2021

(65) Prior Publication Data

US 2022/0291971 A1  Sep. 15, 2022

(51) Int. Cl.
*G06F 9/52* (2006.01)
*G06F 9/54* (2006.01)

(52) U.S. Cl.
CPC ............... *G06F 9/52* (2013.01); *G06F 9/542* (2013.01)

(58) Field of Classification Search
CPC .................................. G06F 9/52; G06F 9/542
See application file for complete search history.

(56) References Cited

U.S. PATENT DOCUMENTS

| | | | | |
|---|---|---|---|---|
| 2011/0047556 A1* | 2/2011 | Nishihara | ................. | G06F 9/52 718/106 |
| 2014/0026143 A1* | 1/2014 | Suzuki | ..................... | G06F 9/52 718/104 |
| 2019/0146856 A1* | 5/2019 | Brief | ..................... | G06F 9/3861 719/318 |
| 2019/0340039 A1* | 11/2019 | Shveidel | ............. | G06F 16/1774 |

* cited by examiner

*Primary Examiner* — Cao H Nguyen
(74) *Attorney, Agent, or Firm* — DALY, CROWLEY, MOFFORD & DURKEE, LLP (57) ABSTRACT

In one aspect, an example methodology implementing the disclosed techniques includes, responsive to a determination, by a first thread attempting to start an operation, that a second thread has started the operation, obtaining a value of a stamp included in a synchronization object related to the operation. The method also includes determining, by the first thread, whether the value of the stamp obtained is the same as a current value of the stamp and, responsive to a determination that the obtained value of the stamp is not the same as the current value of the stamp, continuing execution of the first thread. The method may further include, responsive to a determination that the obtained value of the stamp is the same as the current value of the stamp, suspending execution of the first thread.

20 Claims, 7 Drawing Sheets

SYNCHRONIZATION OBJECT HAVING A STAMP FOR FLOWS IN A STORAGE SYSTEM

BACKGROUND

A distributed storage system may include storage devices (e.g., storage arrays) and nodes (also known as disk controllers). Each node may be connected to a disk array enclosure (DAE), which is composed of an array of drives. The storage devices and the nodes may be situated in the same physical location, or in one or more physically remote locations. The storage devices and the nodes may be coupled via a full-mesh network. The distributed storage system may be managed by a system manager.

A storage system may implement a Redundant Array of Independent Disks (RAID) 6 parity protection configuration to store the data. In the RAID 6 configuration, the RAID is organized into grids, with N rows and K columns called stripes. The RAID 6 configuration allows for recovering data in up to two concurrent drive failures.

Such storage systems may include operations that are triggered through multiple different flows in the system. Taking data recovery as an example, the system manager may trigger a background rebuild process upon detecting drive failures. This background rebuild process is a flow which runs in the background and iterates over each stripe, reads the entire grid, reconstructs all the missing data blocks, and writes the data blocks to other (healthy) disks. The background rebuild process is an example of a regular flow. During the rebuild process, a client may issue a read request for a data block that resides on a failed disk. Since the background rebuild process has not yet rebuilt the data on the failed disk, the read request must recover the data block in order to return the correct data to the client. In this instance, the read request may trigger a flow to rebuild the data block. The flow triggered by the read request to rebuild the data block is an example of a forced flow.

In cases where a storage system supports high availability (HA) scenarios, a HA component in a computing system may also have multiple flows that trigger the same process. For example, when a node fails, a disconnection process of a module that is running on that node may occur due to an indication that the node has failed. A disconnection process of a module may also occur as a result of a timeout of a message between the module and another (healthy) module in in the system. A disconnection process of a module may occur for any number of other reasons, such as a user triggering a force node disconnection, which includes disconnection of all the modules running on the node.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a computer implemented method for synchronizing on a notification event includes, responsive to a determination, by a first thread attempting to start an operation, that a second thread has started the operation, obtaining a value of a stamp included in a synchronization object related to the operation. The method also includes determining, by the first thread, whether the value of the stamp obtained is the same as a current value of the stamp and, responsive to a determination that the obtained value of the stamp is not the same as the current value of the stamp, continuing execution of the first thread.

In some embodiments, the method further includes, responsive to a determination that the obtained value of the stamp is the same as the current value of the stamp, suspending execution of the first thread.

In some embodiments, suspending execution of the first thread includes waiting in a thread queue associated with the synchronization object related to the operation.

In some embodiments, the method further includes resuming execution of the first thread upon being released from the thread queue associated with the synchronization object related to the operation.

In some embodiments, the first thread is released from the thread queue by the second thread upon the second thread completing the operation.

In some embodiments, the value of the stamp is incremented by the second thread upon completing the operation.

In some embodiments, the first thread and the second thread are threads in a storage system.

In some embodiments, the first thread is associated with a forced flow and the second thread is associated with a regular flow.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to, responsive to a determination, by a first thread attempting to start an operation, that a second thread has started the operation, obtain a value of a stamp included in a synchronization object related to the operation. Execution of the instructions also causes the one or more processors to determine, by the first thread, whether the value of the stamp obtained is the same as a current value of the stamp and, responsive to a determination, by the first thread, that the obtained value of the stamp is not the same as the current value of the stamp, continue execution of the first thread.

In some embodiments, execution of the instructions further causes the one or more processors to, responsive to a determination, by the first thread, that the obtained value of the stamp is the same as the current value of the stamp, suspend execution of the first thread.

In some embodiments, to suspend execution of the first thread includes to wait in a thread queue associated with the synchronization object related to the operation.

In some embodiments, execution of the instructions further causes the one or more processors to resume execution of the first thread upon being released from the thread queue associated with the synchronization object related to the operation.

In some embodiments, the first thread is released from the thread queue by the second thread upon completion of the operation.

In some embodiments, the value of the stamp is incremented by the second thread upon completion of the operation.

According to another illustrative embodiment provided to illustrate the broader concepts described herein, a computer program product includes one or more non-transitory machine-readable mediums encoding instructions that when executed by one or more processors cause a process to be carried out for synchronization on a notification event. The process includes, responsive to a determination, by a first thread attempting to start an operation, that a second thread has started the operation, obtaining a value of a stamp included in a synchronization object related to the operation. The process also includes determining, by the first thread, whether the value of the stamp obtained is the same as a current value of the stamp and, responsive to a determination that the obtained value of the stamp is not the same as the current value of the stamp, continuing execution of the first thread.

In some embodiments, the process further includes, responsive to a determination that the obtained value of the stamp is the same as the current value of the stamp, suspending execution of the first thread.

In some embodiments, suspending execution of the first thread includes waiting in a thread queue associated with the synchronization object related to the operation.

In some embodiments, the process further includes resuming execution of the first thread upon being released from the thread queue associated with the synchronization object related to the operation.

In some embodiments, the first thread is released from the thread queue by the second thread upon the second thread completing the operation.

In some embodiments, the value of the stamp is incremented by the second thread upon completing the operation.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

As noted above, a storage system may include operations that a triggered through multiple different flows in the system. For instance, different flows may wait until an operation completes in order to continue with the flow. However, the actual operation is initiated (e.g., performed) only by one of these flows (i.e., a first thread that attempted to start the operation), and the other flows wait for completion of the operation. Therefore, a synchronization technique is needed that allows the other waiting threads to be notified when the operation is completed. Unfortunately, the existing synchronization method of sending a broadcast event to signal the completion of the operation can create a race condition in which a waiting thread may miss the notification event, which results in a deadlock where the waiting thread will wait forever.

Figure 1:
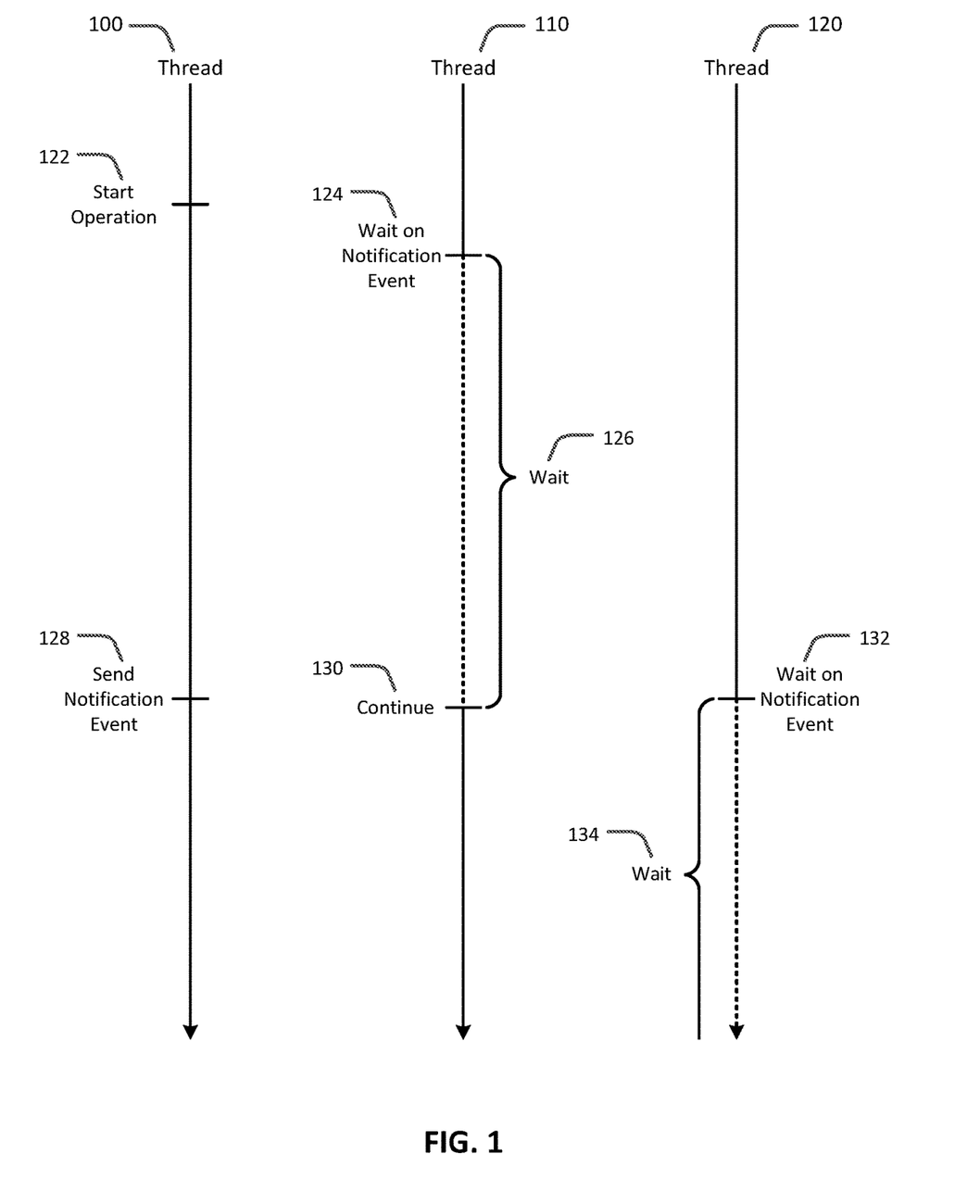
FIG. 1 is an illustrative flow diagram of multiple threads synchronizing on a notification event.

For example, FIG. 1 shows a thread 100 starting an operation at 122. For instance, the operation may be to recover a failed component in a storage system, such as a stripe on a failed disk. While thread 100 is performing the recovery of the data residing on the stripe, a thread 110 waits for completion of the operation at 124. For example, thread 110 may wait in a waiting queue for a time period 126 for thread 100 to send a broadcast event to signal the completion of completion of the operation at 128. Upon receiving the broadcast event signaling the completion of the operation, thread 110 can continue with the flow. Shortly after thread 100 sends a broadcast event to signal the completion of completion of the operation at 128, a thread 120 waits for completion of the operation at 132. However, since the broadcast event signaling the completion of the operation was sent before thread 120 starts waiting on the completion of the operation, thread 120 will never receive the broadcast event signaling the completion of the operation and will wait forever at 134.

Embodiments of the concepts, techniques, and structures disclosed herein are directed to a synchronization object that includes a stamp. Various implementations of the synchronization object described herein provide hermetic synchronization between different flows (e.g., regular flows and/or forced flows) and guarantee that a thread waiting on a completion of an operation will always be released when a notification event signaling the completion of the operation occurred. In other words, the synchronization object guarantees that a notification event signaling a completion of an operation will never be missed by any thread waiting on the completion of the operation. It will be further understood that various changes in the details, materials, and arrangements of the parts that have been described and illustrated herein might be made by those skilled in the art without departing from the scope of the following claims.

Figure 2:
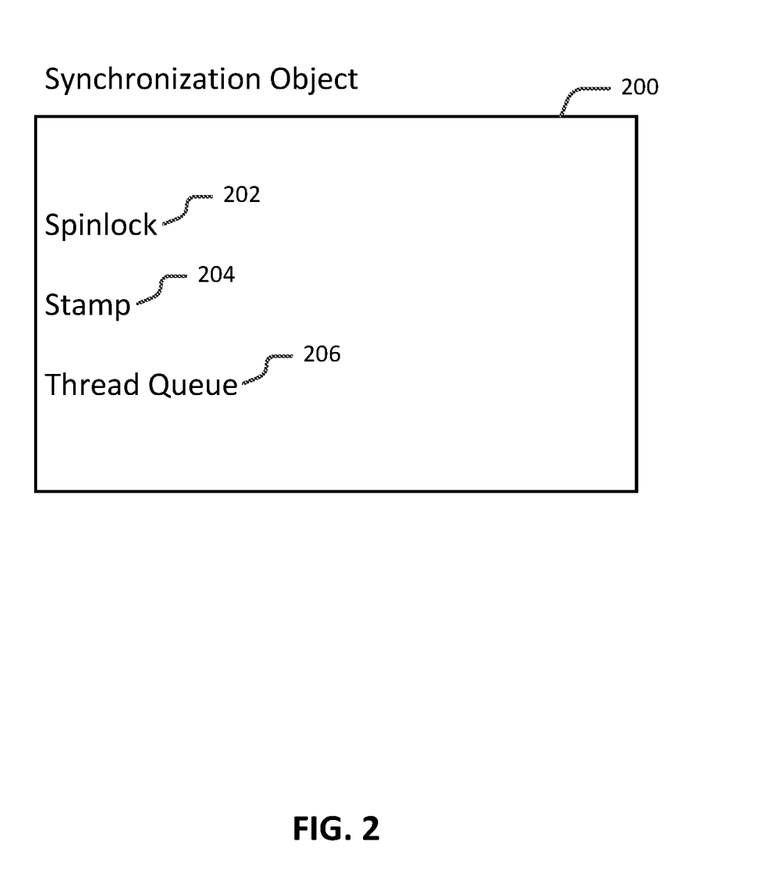
FIG. 2 is an illustrative diagram of a synchronization object, in accordance with an embodiment of the present disclosure.

FIG. 2 is an illustrative diagram of a synchronization object 200, in accordance with an embodiment of the present disclosure. In embodiments, synchronization object 200 can be associated with an operation on a component or a resource of a computing system such as, for example, a storage system or a database system, to provide two examples. For example, a component may be a disk drive of a storage system, and an operation may be to recover the data on the disk upon a failure of the disk. As another example, a component may be the individual stripes on a disk of a RAID storage system, and an operation may be to rebuild the data located on the stripe to recover the data upon a failure of the disk. As yet another example, a component may be a journal of a database system, and an operation may be to write the journal entries to a disk drive (e.g., solid-state drive) upon the journal becoming full. As a further example, a component may be a module (e.g., a HA component) in a computing system, and an operation may be to recover the module upon a failure of the module. As discussed in more detail below, synchronization object 200 may be used, in part, to synchronize threads waiting on an operation on the completion of the operation.

As shown in FIG. 2, synchronization object 200 includes a spinlock 202, a stamp 204, and a thread queue 206. Spinlock 202 operates to provide atomicity on all operations (e.g., updating stamp 204, managing thread queue 206, etc.) on synchronization object 200. To this end, in an implementation, spinlock 202 may be a spinlock that enforces limits on access to synchronization object 200. For example, a thread wanting to perform an operation on synchronization object 200 acquires spinlock 202 before performing the operation on synchronization object 200. Once the thread has acquired spinlock 202, synchronization object 200 becomes "locked", and the thread that is holding spinlock 202 is provided exclusive access to synchronization object 200. While this thread holds spinlock 202, any other thread or process trying to acquire spinlock 202 (e.g., to perform an operation on synchronization object 200) waits in a loop (e.g., spins) while repeatedly checking to see whether spinlock 202 is available.

Stamp 204 operates to distinguish between instances of the operation associated with synchronization object 200. In an implementation, stamp 204 may be a counter that is set to an initial value (e.g., '0'), and incremented by a value of one ('1') each time an instance of the operation is completed. For example, suppose synchronization object 200 is being utilized to synchronize on an operation, such as a rebuild of stripe 75 on a failed disk. Also suppose that the current value of stamp is three ('3') and that a thread has started a rebuild of stripe 75 on the failed disk. Upon completing the rebuild of stripe 75, the thread can increment the value of stamp 204 by one ('1') (i.e., set the value of stamp 204 to four). Incrementing the value of stamp 204 serves to distinguish the rebuild of stripe 75 that was performed while the value of stamp 204 was three ('3') from any other rebuild of stripe 75 that may have been or will be performed while the value of stamp 204 is a different value (i.e., a value other than three). Also, incrementing the value of stamp 204 to four ('4') may serve as a notification event that signals the completion of the operation (i.e., rebuild of stripe 75) that was initiated when the value of stamp 204 was three ('3').

Thread queue 206 operates as a container (e.g., a buffer) to hold the threads waiting for completion of an operation associated with synchronization object 200. Continuing the stripe 75 rebuild example above, a thread waiting for stripe 75 to be rebuilt can wait in thread queue 206 of synchronization object 200 that is being utilized to synchronize threads waiting on the rebuild of stripe 75 for completion of the rebuild process. Then, when stripe 75 is rebuilt, by another thread for example, the thread waiting in thread queue 206 for the completion of the rebuild process can be released from thread queue 206 for continued execution (e.g., to read data from stripe 75).

Note that each actual operation (e.g., rebuild, disconnection, flush, etc.) may have a state and a state lock (e.g., a spinlock). A state associated with an operation operates to provide an indication of a current state of the operation. For example, an operation to rebuild a specific stripe on a failed disk can have a state that indicates that a process is not running to recover the data on the specific stripe (e.g., NOT_IN_RECOVERY), a state that indicates that a process is running to recover the data on the specific stripe (e.g., IN_RECOVERY), or a state that indicates that a process to recover the data on the specific stripe has completed and the data on the specific stripe has been recovered (e.g., NOR-MAL). As another example, an operation to restart a failed module in a computing system can have a state that indicates that a process is not running to restart the failed module (e.g., NOT_IN_RECOVERY), a state that indicates that a process is running to restart the failed module (e.g., IN_RECOVERY), or a state that indicates that a process to restart the failed module has completed and the module is now running (e.g., NORMAL). A state lock associated with an operation operates to control access to the state information (i.e., indication of the current state) related to the operation. For example, a thread wanting to change the state of an operation to rebuild a failed disk drive acquires a state lock related to the operation before changing the state of the operation. Once the thread has acquired the state lock related to the operation, the state information related to the operation becomes "locked", and the thread is provided exclusive access to the state information (e.g., the thread can determine a current state; the thread can change the state of the operation from NOT_IN_RECOVERY to IN_RECOVERY; etc.).

Figure 3:
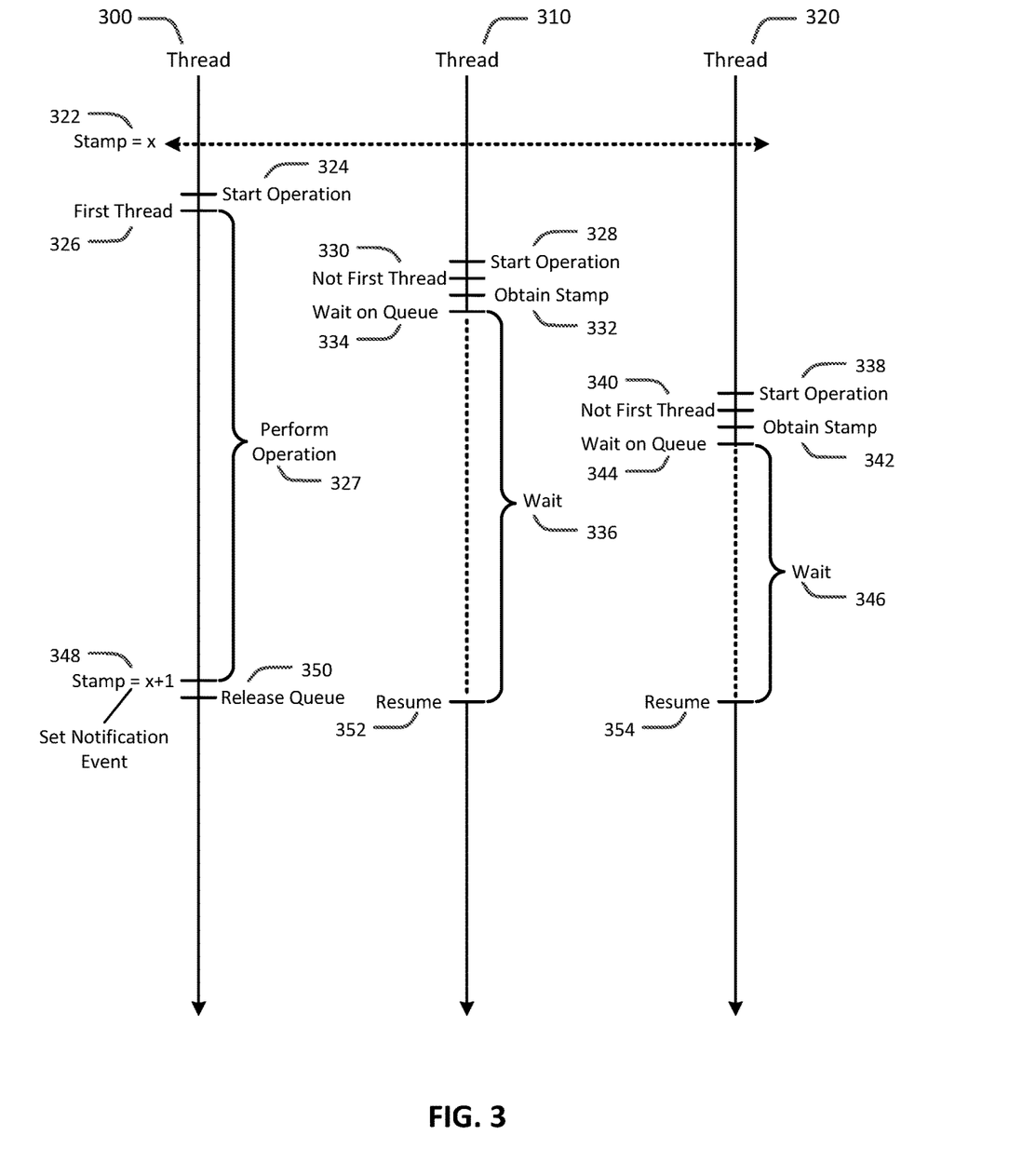
FIG. 3 is an illustrative flow diagram of multiple threads utilizing a synchronization object, in accordance with an embodiment of the present disclosure.

FIG. 3 is an illustrative flow diagram of threads 300, 310, and 320 utilizing a synchronization object, in accordance with an embodiment of the present disclosure. In the illustrative flow diagram of FIG. 3, threads 300, 310, and 320 may be running within a computing system and utilizing the synchronization object to synchronize on a notification event signaling completion of an operation to recover a failed component in the computing system. A stamp associated with the synchronization object may have a value of x at 322. Thread 300 ascertains that the operation needs to be performed and attempts to start the operation at 324. Thread 300 can determine that it is the first thread to perform the operation (i.e., that a process is not running to perform the operation) at 326. Based on the determination that it is the first thread, thread 300 can perform the operation at 327. Note that the instance of the operation being performed by thread 300 is associated with the stamp having a value of x.

Thread 310 ascertains that the operation needs to be performed and attempts to start the operation at 328. Thread 310 can determine that it is not the first thread to perform the operation (i.e., that another process is running to perform the operation) at 330. Based on the determination that it is not the first thread, thread 310 can obtain the stamp associated with the synchronization object at 332. Note that the stamp obtained by thread 310 has a value of x. Upon obtaining the stamp, thread 310 can check the value of the obtained stamp (stamp=x) against the current value of the stamp (stamp=x). The current value of the stamp serves to indicate the instance of the operation that is being performed or that will be performed. Since the value of the obtained stamp and the current value of the stamp are the same, thread 310 can determine that the operation that thread 310 is waiting on (i.e., the instance of the operation that needs to be performed) has not been completed. Thread 310 can then wait in a thread queue associated with the synchronization object for the operation to complete (i.e., the operation to be performed) at 334. In an embodiment, while waiting in the thread queue for a wait period 336, thread 310 may suspend execution in a manner as to not consume processor (i.e., CPU) cycles. For example, thread 310 may release the CPU.

Still referring to FIG. 3, thread 320 ascertains that the operation needs to be performed and attempts to start the operation at 338. In a manner similar to thread 310, thread 320 can determine that it is not the first thread to perform the operation (i.e., that another process is running to perform the operation) at 340. Based on the determination that it is not the first thread, thread 320 can obtain the stamp associated with the synchronization object at 342. Note that the stamp obtained by thread 320 still has a value of x. Upon obtaining the stamp, thread 320 can check the value of the obtained stamp (stamp=x) against the current value of the stamp (stamp=x). Since the value of the obtained stamp and the current value of the stamp are the same, thread 320 can determine that the operation that thread 320 is waiting on (i.e., the instance of the operation that needs to be performed) has not been completed. Thread 320 can then wait in the thread queue associated with the synchronization object for the operation to complete (i.e., the operation to be performed) at 334. Note that thread 310 is also in the thread queue waiting for the operation to complete. In an embodiment, while waiting in the thread queue for a wait period 346, thread 320 may suspend execution in a manner as to not consume CPU cycles. For example, thread 320 may release the CPU.

Upon completing the operation, thread 300 can generate a notification event signaling the completion of the operation by incrementing by one ('1') the value of the stamp (stamp=x+1) associated with the synchronization object at 348. Incrementing the value of the stamp provides an indication that the instance of the operation that was started when the stamp was at the previous value (stamp=x) has completed. In other words, the new value of the stamp (stamp=x+1) serves as an indication that the processing of the operation that was started when the stamp was at the previous value (stamp=x) has been performed. Thread 300 can then release the threads (e.g., threads 310 and 320) that are waiting in the thread queue associated with the synchronization object at 350. Upon being released from the thread queue, thread 310 can resume execution at 352 and thread 320 can resume execution at 354. In this manner, threads 310 and 320 can be synchronized on the notification event signaling the completion of the operation.

Figure 4:
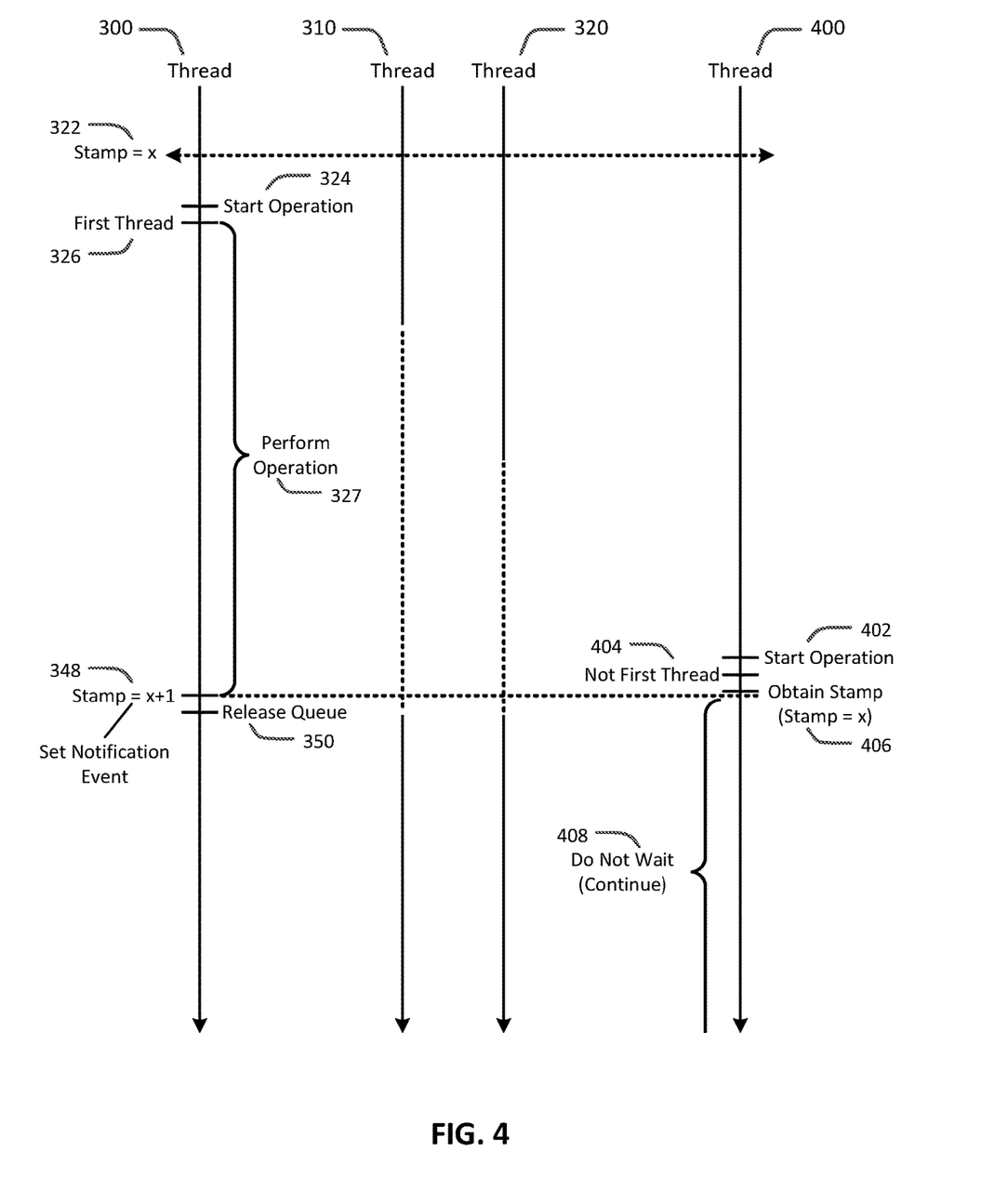
FIG. 4 is an illustrative flow diagram of a thread utilizing the synchronization object of FIG. 3, in accordance with an embodiment of the present disclosure.

Turning to FIG. 4, in which like elements of FIG. 3 are shown using like reference designators, an illustrative flow diagram of a thread 400 utilizing the synchronization object of FIG. 3 is shown. The illustrative flow diagram of FIG. 4 is a continuation of the illustrative flow diagram of FIG. 3.

As shown, thread 400 ascertains that the operation needs to be performed and attempts to start the operation at 402. Note that, at this instance in time, thread 300 is still performing the operation (i.e., thread 300 has not completed the operation). Thread 400 can determine that it is not the first thread to perform the operation (i.e., that another process is running to perform the operation) at 404. Based on the determination that it is not the first thread, thread 400 can obtain the stamp associated with the synchronization object at 406. Note that the stamp obtained by thread 400 still has a value of x since thread 300 has not yet incremented the value of the stamp. Upon obtaining the stamp, thread 400 can check the obtained value of the stamp (stamp=x) against the current value of the stamp (stamp=x+1). Since the obtained value of the stamp and the current value of the stamp are not the same, thread 400 can determine that the operation that thread 400 is waiting on (i.e., the instance of the operation that needs to be performed) has been completed. In this case, thread 300 that was performing the operation has completed the operation and may have released the threads that were waiting in the thread queue associated with the synchronization object. Based on this determination, thread 400 does not wait for the completion of the operation (i.e., does not wait in the thread queue associated with the synchronization object) and continues execution at 408.

If thread 400 determines that the obtained value of the stamp and the current value of the stamp are the same, thread 400 can determine that the operation that thread 400 is waiting on (i.e., the instance of the operation that needs to be performed) has not been completed. More specifically, thread 400 can determine that the thread performing the operation (i.e., thread 300) has not yet released the threads waiting in the thread queue associated with the synchronization object subsequent to completing the operation. Thread 400 can then wait in the thread queue associated with the synchronization object to be released from the thread queue upon the operation being completed. In any case, thread 400 is assured of not missing the notification event signaling completion of the operation on which thread 400 is waiting on.

Figure 5:
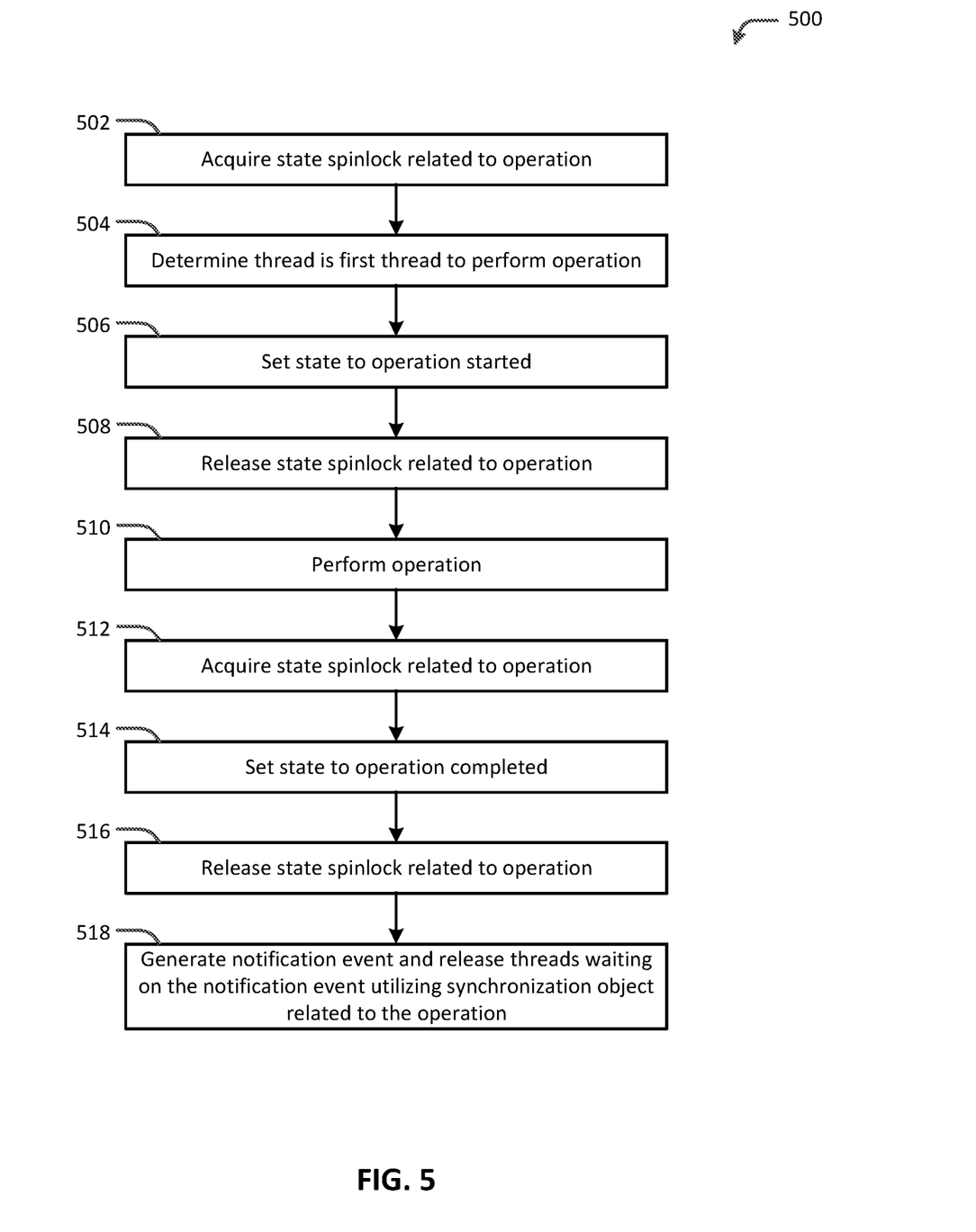
FIG. 5 is a flow diagram of an illustrative process for synchronizing on a notification event signaling a completion of an operation utilizing a synchronization object, in accordance with an embodiment of the present disclosure.

FIG. 5 is a flow diagram of an illustrative process 500 for synchronizing on a notification event signaling a completion of an operation utilizing a synchronization object, in accordance with an embodiment of the present disclosure. For example, a client may issue an I/O request to read a data block on a stripe residing on a disk. A thread that is handling the client I/O may determine that the disk has failed (e.g., state information associated with the disk indicates that the disk is in a failed state) and that the data block needs to be recovered in order to return the correct data to the client.

With reference to process 500, at 502, the thread may acquire a state spinlock related to the operation. In this example, the operation is to recover the data block on the stripe residing on the failed disk. The acquired state spinlock provides the thread holding the spinlock exclusive access to the state information related to the operation.

At 504, the thread may determine that it is the first thread to perform the operation. For example, the thread may check the state information and determine from the state information that another process (e.g., thread) is not running to recover the data block on the stripe (e.g., NOT_IN_RECOVERY). In this case, the thread may be considered as being initiated from a forced flow since the operation to recover the data block is triggered by a client request. At 506, the thread may set the state information to indicate that the operation to recover the data block on the stripe has been started (e.g., IN_RECOVERY). Upon setting the state information, at 506, the thread may release the state spinlock related to the operation.

At 508, the thread may perform the operation to recover the data block on the stripe residing on the failed disk. Upon completing the operation to recover the data block, at 512, the thread may acquire a state spinlock related to the operation. At 514, the thread may set the state information to indicate that the operation to recover the data block on the stripe has completed (e.g., NORMAL). In embodiments, the set state information may also serve as an indication that the data block has been rebuilt on a disk that is operating normally. Upon setting the state information, at 516, the thread may release the state spinlock related to the operation.

At 518, the thread may generate a notification event signaling the completion of the operation to recover the data block on the stripe. The thread may also release the threads that are waiting on the notification event (release the threads that are waiting in a thread queue associated with a synchronization object related to the operation). In an implementation, the thread may use the following event_with_stamp_set_event(obj) application program interface (API) to generate a notification event and release the threads:

```
event_with_stamp_set_event(obj) {
  obj.spinlock_lock( );
  obj.stamp += 1; /* notification event */
  /* go over the ThreadQueue and release all waiting threads; */
  while (obj.waiting_thread_queue is not empty) {
    remove thread from queue and release it from waiting state( );
  }
  obj.spinlock_unlock( );
}
```

In the event_with_stamp_set_event(obj) API, "obj" is the synchronization object related to the operation to recover the data block on the stripe residing on the failed disk. The "obj.spinlock lock( )" function acquires a spinlock related to the synchronization object, and the "obj.spinlock unlock( )" function releases the spinlock related to the synchronization object. In the event_with_stamp _set_event(obj) API, incrementing by one ('1') the value of the stamp associated with the synchronization object ("obj.stamp +=1") serves as a notification event that signals the completion of the operation. The function in the while loop ("remove thread from queue and release it from waiting state( )") releases the threads that are waiting in the thread queue associated with the synchronization object.

Figure 6:
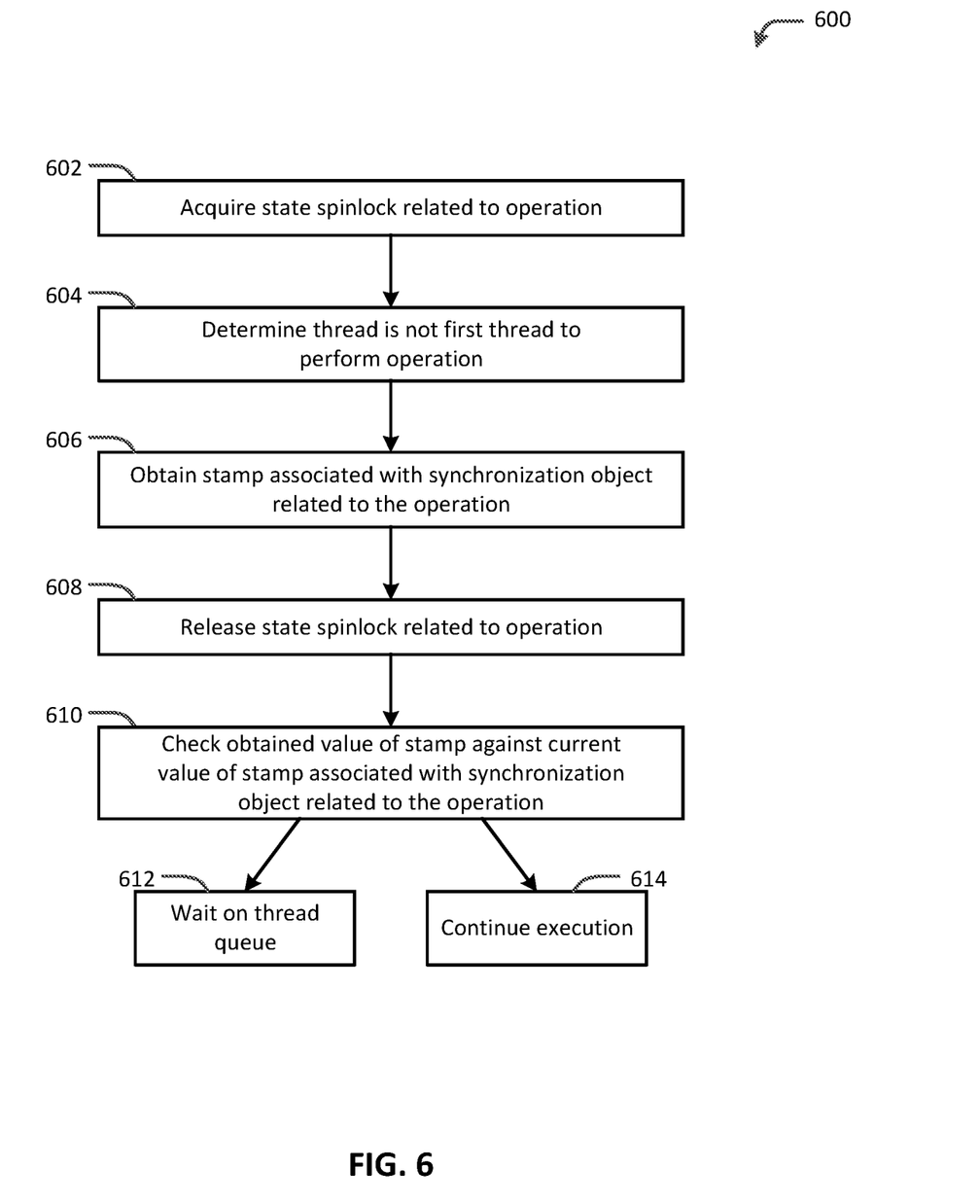
FIG. 6 is a flow diagram of another illustrative process for synchronizing on a notification event signaling a completion of an operation utilizing a synchronization object, in accordance with an embodiment of the present disclosure.

FIG. 6 is a flow diagram of another illustrative process 600 for synchronizing on a notification event signaling a completion of an operation utilizing a synchronization object, in accordance with an embodiment of the present disclosure. For example, a client may issue an I/O request to read a data block on a stripe residing on a disk. A thread that is handling the client I/O may determine that the disk has failed (e.g., state information associated with the disk indicates that the disk is in a failed state) and that the data block needs to be recovered in order to return the correct data to the client.

With reference to process 600, at 602, the thread may acquire a state spinlock related to the operation. In this example, the operation is to recover the data block on the stripe residing on the failed disk. The acquired state spinlock provides the thread holding the spinlock exclusive access to the state information related to the operation.

At 604, the thread may determine that it is not the first thread to perform the operation. For example, the thread may check the state information and determine from the state information that another process (e.g., a thread initiated from a normal flow to recover the failed drive) is running to recover the data block on the stripe (e.g., IN_RECOVERY). In this case, the thread may be considered as being initiated from a forced flow since the operation to recover the data block is triggered by a client request.

At 606, the thread may obtain a stamp (e.g., a value currently assigned to the stamp) associated with a synchronization object related to the operation. Note that the thread holds the state lock related to the operation while obtaining the stamp associated with a synchronization object related to the operation. This prevents another thread from changing the state of the operation (e.g., change the state information from IN_RECOVERY to NORMAL or NOT_IN_RECOVERY) since the thread is holding the state lock related to the operation. In an implementation, the thread may use the following event_with_stamp_get_stamp(obj) API to obtain a current value of the stamp associated with a synchronization object related to the operation:

```
event_with_stamp_get_stamp(obj) {
  obj.spinlock_lock( );
  stamp = obj.stamp;
  obj .spinlock_unlock( );
  return stamp;
}
```

In the event_with_stamp_get_stamp(obj) API, "obj" is the synchronization object related to the operation to recover the data block on the stripe residing on the failed disk. The "obj.spinlock lock( )" function acquires a spinlock related to the synchronization object, and the "obj.spinlock unlock( )" function releases the spinlock related to the synchronization object. The event_with_stamp_get_stamp(obj) API returns the current value of the stamp.

Still referring to process 600 of FIG. 6, upon obtaining the current value of the stamp associated with the synchronization object related to the operation, at 608, the thread may release the state spinlock related to the operation. Releasing the state spinlock allows another thread to acquire the state spinlock and change the state of the operation, for example.

At 610, the thread may check the obtained value of the stamp (i.e., the value of the stamp obtained at 606) against the current value of the stamp associated with the synchronization object related to the operation. If the obtained value of the stamp and the current value of the stamp are the same, then, at 612, the thread may wait in a thread queue associated with the synchronization object related to the operation. In this case, the operation to recover the data block on the stripe residing on the failed disk has not completed and the thread can wait in the thread queue to be released from the thread queue upon completion on the operation. In an embodiment, the thread may suspend execution in a manner as to not consume CPU cycles while waiting in the thread queue.

Otherwise, if the obtained value of the stamp and the current value of the stamp are not the same, then, at 614, the thread may continue execution and not wait for a notification event signaling the completion of the operation. In this case, the operation to recover the data block on the stripe residing on the failed disk has completed and the notification event signaling the completion of the operation has been generated.

In an implementation, the thread may use the following event_with_stamp_wait(obj, stamp) API to check the obtained value of the stamp against the current value of the stamp associated with synchronization object related to the operation.:

```
event_with_stamp_wait(obj, stamp) {
  obj.spinlock_lock ( );
  /* if there were notification events after stamp was taken, */
  /* i.e. obtained stamp different than object's stamp */
  /* (assumption is that stamp is always taken by
  event_with_stamp_get_stamp( ) */
  /* and object's stamp may grow only), then return immediately - no
  waiting */
  /* required as the notification event already occurred */
  if (obj.stamp != stamp) {
    obj.spinlock_unlock( );
    return;
  }
  obj.ThreadQueue.add(this thread);
  suspend(this thread);
  obj.spinlock_unlock( );
}
```

In the event_with_stamp_wait(obj, stamp) API, "obj" is the synchronization object related to the operation to recover the data block on the stripe residing on the failed disk and "stamp" is the value of the stamp that was obtained by the thread. The "obj.spinlock_lock( )" function acquires a spinlock related to the synchronization object, and the "obj.spinlock_unlock( )" function releases the spinlock related to the synchronization object. The event_with_stamp_wait(obj, stamp) API implements the waiting by the thread ("obj.ThreadQueue.add(this thread)" and "suspend(this thread)") in cases where the obtained value of the stamp and the current value of the stamp are the same. The event_with_stamp_wait(obj, stamp) API returns immediately without adding the thread to the thread queue in cases where the obtained value of the stamp and the current value of the stamp are not the same, thus allowing the thread to continue execution.

An example use of a synchronization object for synchronizing on a completion of an operation to recover data on a stripe residing on a failed disk (e.g., process 500 of FIG. 5 and process 600 of FIG. 6) can be implemented using the following illustrative pseudocode:

```
recover_data_page(STRIPE_OBJ) {
    stripe_state_spinlock_lock(STRIPE_OBJ.state_spinlock); /* take the state lock */
    if (STRIPE_OBJ.state == NOT_IN_RECOVERY) {
        /* this is the first thread that will perform the recovery */
        STRIPE_OBJ.state = IN_RECOVERY;
        stripe_state_spinlock_unlock(STRIPE_OBJ.state_spinlock);
        perform_data_recovery( );
        stripe_state_spinlock_lock(STRIPE_OBJ.state_spinlock);
        STRIPE_OBJ.state = NORMAL;
        stripe_state_spinlock_unlock(STRIPE_OBJ.state_spinlock);
        event_with_stamp_set_event(STRIPE_OBJ.event_w_stamp_obj);
        /* this will release all waiting threads */
    }
    else {
    /* other thread already started the operation - this thread will wait for completion*/
    /* keep current stamp (while holding the state lock); */
    /* any notification event issued from this moment will cause "waiters on this */
    /* stamp" to be freed immediately (without even entering the waiting state */
    stamp = event_with_stamp_get_stamp(STRIPE_OBJ.event_w_stamp_obj);
    stripe_state_spinlock_unlock(STRIPE_OBJ.state_spinlock);
    event_with_stamp_wait(stamp);
}
```

In the above illustrative pseudocode, any thread that attempts to start the recovery process after the first thread (i.e., the thread that actually started the recovery process) will take the object stamp while holding the state lock and while the state is IN_RECOVERY. Since this is done while holding the state lock, the first thread (i.e. the thread performing the actual recovery) will not be able to change the state and therefore will not send the completion notification event. As a result, there may be two scenarios: (1) the first thread will set the completion notification event before the waiting thread performs 'event_with_stamp_wait' in this case, the waiting thread will not wait at all because it will provide a stamp (i.e., obtained value of the stamp) that is less than the object stamp (i.e., the current value of the stamp associated with the synchronization object related to the operation), and will not be added to the ThreadQueue and will not be suspended; or (2) the first thread will set the completion notification event after the waiting thread performs 'event_with_stamp_wait' in this case, the waiting thread will be in the object ThreadQueue (i.e., the thread queue associated with the synchronization object related to the operation), and therefore will be released from the object ThreadQueue. In any case, the synchronization object described herein guarantees that the completion notification events will never be missed by any waiting threads.

Figure 7:
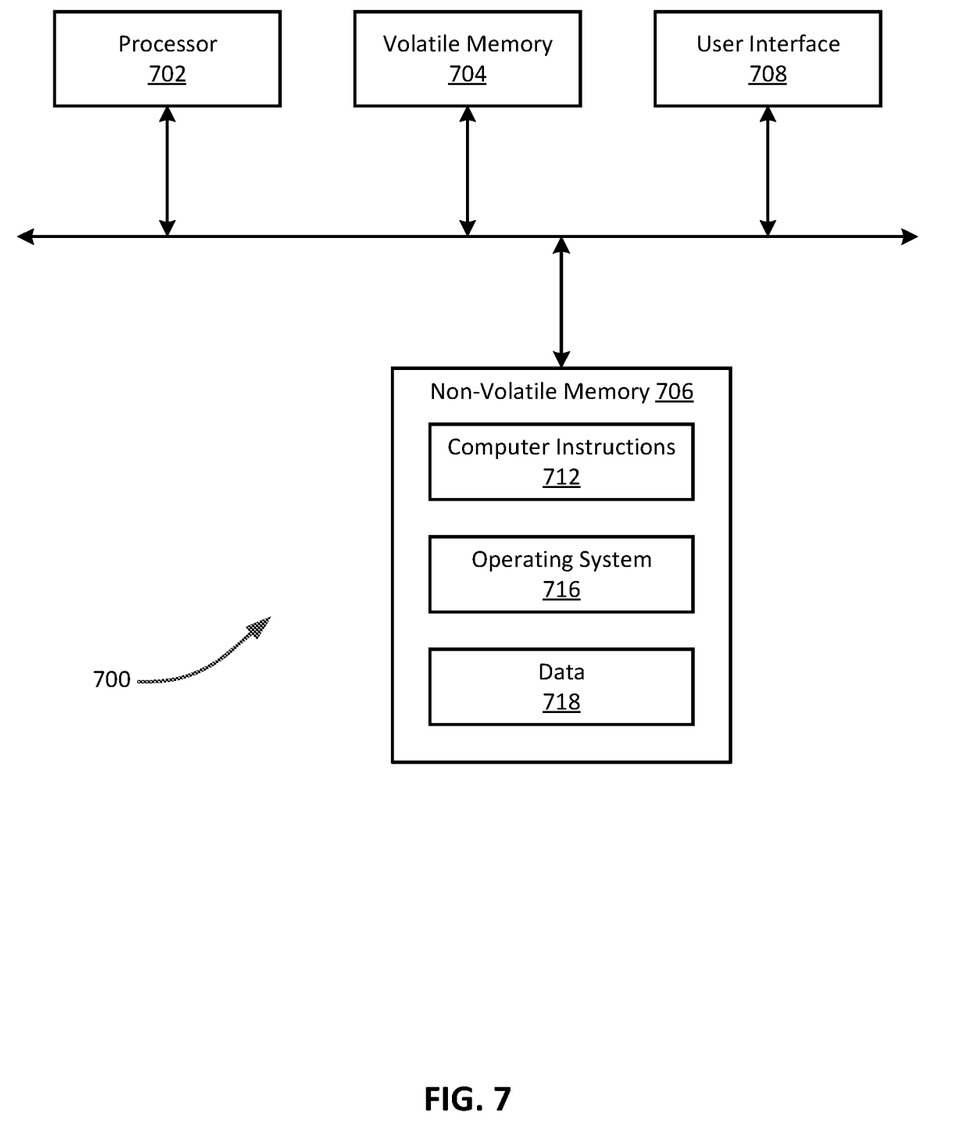
FIG. 7 schematically shows relevant physical components of a computer system that may be used in accordance with an embodiment of the concepts, structures, and techniques disclosed herein.

FIG. 7 schematically shows relevant physical components of a computer system 700 that may be used in accordance with an embodiment of the concepts, structures, and techniques disclosed herein. Computer system 700 includes a processor 702, a volatile memory 704, a non-volatile memory 706 (e.g., hard disk) and a user interface (UI) 708 (e.g., a graphical user interface, a mouse, a keyboard, a display, touch screen and so forth). Non-volatile memory 706 stores computer instructions 712, an operating system 716, and data 718. In one example, computer instructions 712 are executed by processor 702 out of volatile memory 704 to perform all or part of the processes described herein (e.g., processes illustrated and described in reference to FIGS. 1 through 6).

These processes are not limited to use with particular hardware and software; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. In embodiments, the processor can include ASIC, FPGA, and/or other types of circuits. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes of FIGS. 1 through 6 are not limited to the specific processing order illustrated. Rather, any of the processing blocks of the Figures may be re-ordered, combined or removed, performed in parallel or in serial, as necessary, to achieve the results set forth above.

The processing blocks associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device, or a logic gate. It is understood that embodiments of event synchronization are applicable to a variety of systems, objects and applications.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A computer implemented method for synchronizing on a notification event, the method comprising:
responsive to a determination, by a first thread attempting to start an operation, that a second thread has started the operation, obtaining a value of a stamp included in a synchronization object related to the operation, wherein obtaining the value of the stamp includes:
acquiring a spinlock of the synchronization object,
reading the value of the stamp from the synchronization object, and
releasing the spinlock of the synchronization object;
determining, by the first thread, a current value of the stamp by:
reacquiring the spinlock of the synchronization object,
rereading the value of the stamp from the synchronization object, and
rereleasing the spinlock of the synchronization object;
determining, by the first thread, whether the value of the stamp obtained is the same as the current value of the stamp; and
responsive to a determination, by the first thread, that the obtained value of the stamp is not the same as the current value of the stamp, continuing execution of the first thread.

2. The method of claim 1, further comprising, responsive to a determination, by the first thread, that the obtained value of the stamp is the same as the current value of the stamp, suspending execution of the first thread.

3. The method of claim 2, wherein suspending execution of the first thread comprises waiting in a thread queue associated with the synchronization object related to the operation.

4. The method of claim 3, further comprising resuming execution of the first thread upon being released from the thread queue associated with the synchronization object related to the operation.

5. The method of claim 4, wherein the first thread is released from the thread queue by the second thread upon the second thread completing the operation.

6. The method of claim 1, wherein the value of the stamp is incremented by the second thread upon completing the operation.

7. The method of claim 1, wherein the first thread and the second thread are threads in a storage system.

8. The method of claim 1, wherein the first thread is associated with a forced flow and the second thread is associated with a regular flow.

9. A system comprising:
one or more non-transitory machine-readable mediums configured to store instructions; and
one or more processors configured to execute the instructions stored on the one or more non-transitory machine-readable mediums, wherein execution of the instructions causes the one or more processors to,
responsive to a determination, by a first thread attempting to start an operation, that a second thread has started the operation, obtain a value of a stamp included in a synchronization object related to the operation, wherein obtaining the value of the stamp includes:
acquiring a spinlock of the synchronization object,
reading the value of the stamp from the synchronization object, and
releasing the spinlock of the synchronization object;
determine, by the first thread, a current value of the stamp by:
reacquiring the spinlock of the synchronization object,
rereading the value of the stamp from the synchronization object, and
rereleasing the spinlock of the synchronization object;
determine, by the first thread, whether the value of the stamp obtained is the same as the current value of the stamp; and
responsive to a determination, by the first thread, that the obtained value of the stamp is not the same as the current value of the stamp, continue execution of the first thread.

10. The system of claim 9, wherein execution of the instructions further causes the one or more processors to, responsive to a determination, by the first thread, that the obtained value of the stamp is the same as the current value of the stamp, suspend execution of the first thread.

11. The system of claim 10, wherein to suspend execution of the first thread comprises to wait in a thread queue associated with the synchronization object related to the operation.

12. The system of claim 11, wherein execution of the instructions further causes the one or more processors to resume execution of the first thread upon being released from the thread queue associated with the synchronization object related to the operation.

13. The system of claim 12, wherein the first thread is released from the thread queue by the second thread upon completion of the operation.

14. The system of claim 9, wherein the value of the stamp is incremented by the second thread upon completion of the operation.

15. A computer program product including one or more non-transitory machine-readable mediums encoding instructions that when executed by one or more processors cause a process to be carried out for synchronization on a notification event, the process comprising:
responsive to a determination, by a first thread attempting to start an operation, that a second thread has started the operation, obtaining a value of a stamp included in a synchronization object related to the operation, wherein obtaining the value of the stamp includes:
acquiring a spinlock of the synchronization object,
reading the value of the stamp from the synchronization object, and
releasing the spinlock of the synchronization object;
determining, by the first thread, a current value of the stamp by:
reacquiring the spinlock of the synchronization object,
rereading the value of the stamp from the synchronization object, and
rereleasing the spinlock of the synchronization object;
determining, by the first thread, whether the value of the stamp obtained is the same as the current value of the stamp; and responsive to a determination, by the first thread, that the obtained value of the stamp is not the same as the current value of the stamp, continuing execution of the first thread.

16. The computer program product of claim 15, wherein the process further comprises, responsive to a determination, by the first thread, that the obtained value of the stamp is the same as the current value of the stamp, suspending execution of the first thread.

17. The computer program product of claim 16, wherein suspending execution of the first thread comprises waiting in a thread queue associated with the synchronization object related to the operation.

18. The computer program product of claim 17, wherein the process further comprises resuming execution of the first thread upon being released from the thread queue associated with the synchronization object related to the operation.

19. The computer program product of claim 18, wherein the first thread is released from the thread queue by the second thread upon the second thread completing the operation.

20. The computer program product of claim 15, wherein the value of the stamp is incremented by the second thread upon completing the operation.

* * * * *